(12) United States Patent
Saada et al.

(10) Patent No.: US 12,448,127 B2
(45) Date of Patent: Oct. 21, 2025

(54) VEHICLE SEAT HAVING A BACKREST EQUIPPED WITH SHOCK ABSORBING MEANS

(71) Applicant: EXPLISEAT, Paris (FR)

(72) Inventors: Benjamin Saada, Paris (FR); Thomas Chevrier, Paris (FR)

(73) Assignee: EXPLISEAT, Paris (FR)

( * ) Notice: Subject to any disclaimer, the term of this patent is extended or adjusted under 35 U.S.C. 154(b) by 179 days.

(21) Appl. No.: 18/558,583

(22) PCT Filed: Apr. 26, 2022

(86) PCT No.: PCT/FR2022/050788
§ 371 (c)(1),
(2) Date: Nov. 2, 2023

(87) PCT Pub. No.: WO2022/234213
PCT Pub. Date: Nov. 10, 2022

(65) Prior Publication Data
US 2024/0228043 A1    Jul. 11, 2024

(30) Foreign Application Priority Data

May 3, 2021    (FR) ...................................... 2104618

(51) Int. Cl.
*B64D 11/06*    (2006.01)
(52) U.S. Cl.
CPC ................................ *B64D 11/0619* (2014.12)
(58) Field of Classification Search
CPC ................................................ B64D 11/0619
See application file for complete search history.

(56) References Cited

U.S. PATENT DOCUMENTS

| 4,145,081 A | * | 3/1979 | Withers | ............. | B60N 2/42709 297/216.14 |
|---|---|---|---|---|---|
| 2019/0143855 A1 | | 5/2019 | Young et al. | | |
| 2020/0001753 A1 | | 1/2020 | Saada et al. | | |

FOREIGN PATENT DOCUMENTS

EP    3580087 A1    12/2019

OTHER PUBLICATIONS

International Search Report for PCT/FR2022/050788 dated Aug. 30, 2022.
Written Opinion for PCT/FR2022/050788 dated Aug. 30, 2022.

* cited by examiner

*Primary Examiner* — Anthony D Barfield
(74) *Attorney, Agent, or Firm* — McDonald Hopkins LLC

(57) ABSTRACT

A seat intended to be fixed to the floor of a vehicle includes a seat part incorporating a lower frame, and a backrest incorporating an upper frame secured to the lower frame by at least one fastener that allows the backrest to tilt in the event of an impact, by rotation about a transverse axis. The fastener includes a link rod having a first end connected to the lower frame by a first pivot link of axis parallel to the transverse axis, and having a second end connected to the upper frame by way of a second pivot link of axis parallel to the transverse axis. Each pivot link has a rotation brake and/or a system of stops limiting its rotation amplitude. A sacrificial mechanical link connects the lower frame to the upper frame while being situated next to the link rod.

10 Claims, 7 Drawing Sheets

VEHICLE SEAT HAVING A BACKREST EQUIPPED WITH SHOCK ABSORBING MEANS

CROSS-REFERENCE TO RELATED APPLICATIONS

This is the National Stage application of PCT international application PCT/FR2022/050788, filed on Apr. 26, 2022, which claims the priority of French Patent Application No. 2104618, filed May 3, 2021, both of which are incorporated herein by reference in their entireties.

TECHNICAL FIELD

The invention relates to an aircraft seat comprising a seat part and a backrest, and ensuring that in the event of an accident or crash or even emergency landing, the shock of the passenger seated immediately behind this seat and hitting the backrest is absorbed to reduce its intensity.

PRIOR ART

Generally, aircraft seats must undergo tests for certifying that a certain level of safety of the passengers transported is ensured in the event of an accident or crash or even emergency landing.

One of these tests, referred to as "two row", illustrated in FIG. 1, consists in placing a passenger 1 seated on a seat 2, and applying a strong horizontal acceleration that projects them forward, in order to assess the intensity of the impact of their head 3 hitting the upper portion of the backrest of the seat 4 located immediately in front of them.

Such a test is performed with a dummy equipped with sensors connected to a data acquisition system for recording the acceleration sustained by the head during shock. The criterion retained so that the test is successful, called "Head Injury Criterion", is that a variable based on the sum of the acceleration sustained by the head throughout the shock is below a given threshold.

A solution consists in providing that the backrest of the seat 4 tilts forward during the impact of the head to progressively slow down the head in order to absorb the shock. This may be ensured with a spring incorporated into the seat to ensure the progressive slow down of the backrest when it tilts under the effect of the impact.

Another criterion that must be met is that after tilting forward, the backrest of the seat must be able to be brought back to its normal position easily, that is to say by means of the application of a reasonable force, so as not to hinder the evacuation of the aircraft. It is also important that once put upright, the backrest is stable, that is to say that it does not tilt again in the event of application of a moderate force.

Generally, the known solutions for ensuring the absorption of the shock while making it possible to raise the backrest have a significant weight and a significant overall dimension, such that their incorporation into the seat is problematic.

The aim of the invention is to provide a solution for absorbing shock by the backrest the incorporation of which into the seat is the least restrictive as possible.

DISCLOSURE OF THE INVENTION

To this end, the object of the invention is a seat intended to be fixed to the floor of a vehicle, having a seat part incorporating a lower frame, and a backrest incorporating an upper frame secured to the lower frame by at least one fastener enabling the backrest to tilt about a transverse axis of the seat, this fastener comprising:
- a link rod having a first end connected to the lower frame by a first pivot link of axis parallel to the transverse axis, and having a second end to the upper frame by way of a second pivot link of axis parallel to the transverse axis;
- each pivot link having a rotation brake and/or a system of stops limiting its rotation amplitude;
- a sacrificial mechanical link that connects the lower frame to the upper frame while being located opposite the link rod.

With this solution, the sacrificial mechanical link absorbs a portion of the energy of the shock and the braking absorbs another portion of it, such that the adjustment of the level of braking is sufficient to adjust the degree of absorption of the entire fastener.

Another object of the invention is a seat thus defined, having a sliding ring surrounding the tube of the upper frame, and wherein the second pivot link connects the second end of the link rod to this sliding ring.

Another object of the invention is a seat thus defined, wherein a pivot link including a brake has a screw passing through a washer and one end of the link rod while being screwed into a boss, in order to hold tight the link rod end to generate a friction torque during reaction to a rotation of the end of the link rod in relation to the boss to brake this rotation.

Another object of the invention is a seat thus defined, wherein the degree of tightening of the screw makes it possible to adjust the degree of braking of the brake of the pivot link.

Another object of the invention is a seat thus defined, wherein a pivot link including a brake has a link rod made of two half-link rods secured to one another by at least one screw holding tight these two half-link rods on a bearing to generate a friction torque during reaction to a rotation of the link rod in relation to the bearing.

Another object of the invention is a seat thus defined, comprising at least one plastic element interposed between the link rod end and the washer and/or the boss and/or the screw.

Another object of the invention is a seat thus defined, comprising a pivot link including a system of stops that has at least one hole formed in the end of the link rod and a retainer extending into the hole, the hole having about the axis of the link an angular extension greater than that of the retainer.

Another object of the invention is a seat thus defined, comprising a pivot link including a system of stops that has a bearing surface having a cylindrical body supporting a retainer radially protruding from this cylindrical body, this bearing surface being surrounded by a link rod end having an opening surrounding the body, this opening being provided with a notch receiving the retainer, this notch having about the axis of the link an angular extension greater than that of the retainer.

Another object of the invention is a seat thus defined, comprising a fixed sleeve rigidly secured to the lower frame wherein is engaged one end of a tube of the upper frame to form the sacrificial mechanical link located opposite the link rod.

Another object of the invention is a seat thus defined, wherein the end of the tube of the upper frame is fixed to the sleeve wherein it is engaged by gluing.

DETAILED DISCLOSURE OF PARTICULAR EMBODIMENTS

Figure 1:
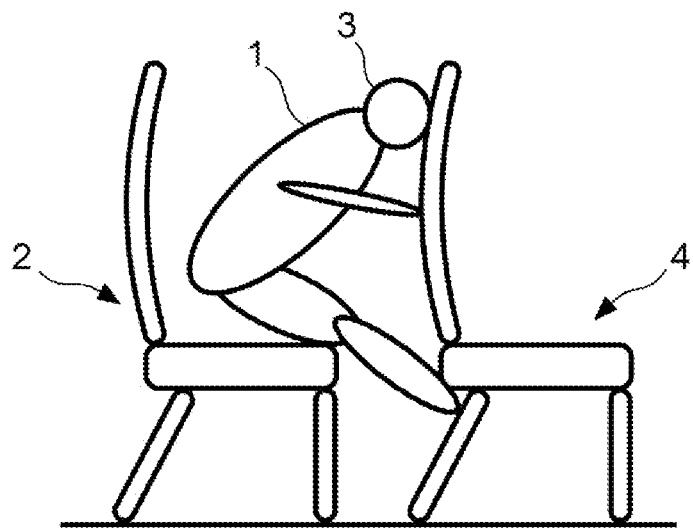
FIG. 1 already described is a representation of a seat test.
Figure 2:
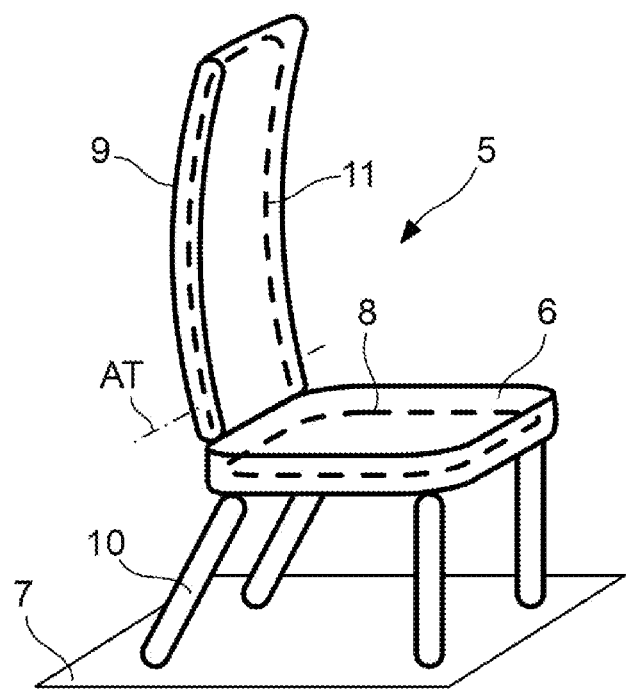
FIG. 2 is a side view of a seat according to the invention.

In FIG. 2, an aircraft seat 5 has a seat part 6 fixed to the floor 7 of an aircraft and supporting a backrest 9. The seat part 6 has a lower frame 8 formed of tubes assembled by connection elements to form a frame to which are fixed pieces of fabric forming the seat part strictly speaking, and the feet 10 by way of which this seat part 6 is rigidly secured to the floor 7.

The backrest 9 has an upper frame 11 supporting pieces of fabric, and which is supported by the lower frame 8 of the seat part by way of one or more fasteners. These fasteners enable the backrest 9 to tilt forward in the event of shock, about a transverse axis AT of the seat, this axis AT being located in the lower region of the backrest 9 along its base.

Figure 3:
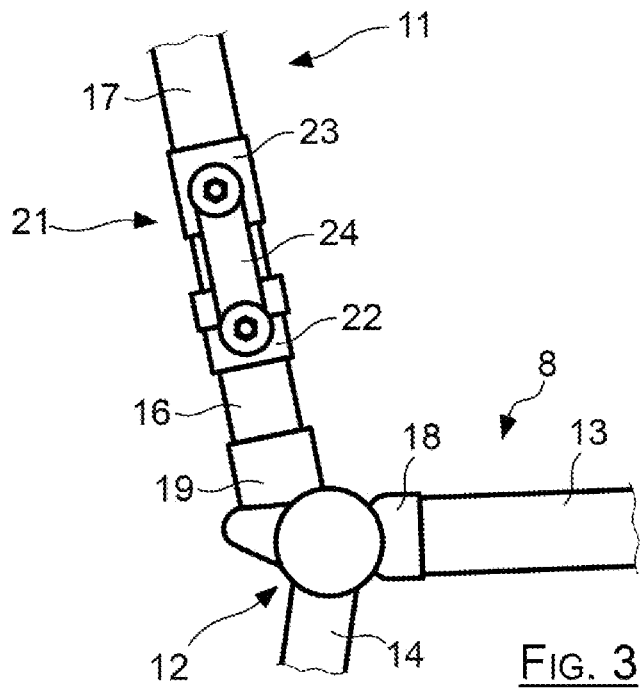
FIG. 3 is a side view showing an upper frame portion and a lower frame portion secured to one another by a fastener according to the invention.

As illustrated in FIG. 3, a lateral rear connection element, referenced 12, connects a rear end of a lateral tube 13 of the lower frame of the seat part 6 to an upper end of a tube 14 forming the foot 10. The seat 5 has another lateral rear connection element of the same type, located on the opposite side of this seat.

This connection element 12 is that by which the lower frame of the seat part 6 supports the upper frame of the backrest 9. It supports a lower end of an intermediate tube 16 which is extended by a lateral tube 17 of the upper frame of the backrest strictly speaking.

The connection element 12 is advantageously a moulded metal part, having tubular base plates 18, 19 each capable of receiving one end of a corresponding tube. The tubes 13, 14 and 16, may be made of composite material, plastic, or even metal, each end engaged in a corresponding base plate of the element 12 being rigidly secured to this base plate, for example by gluing. The unit formed by the element 12 and these tubes is thus an assembly forming a mechanically rigid whole.

The upper end of the intermediate tube 16 is connected to the lower end of the lateral tube 17 by way of an attachment fastener 21 that ensures the holding of the tube 17 in the extension of the intermediate tube 16.

Figure 4:
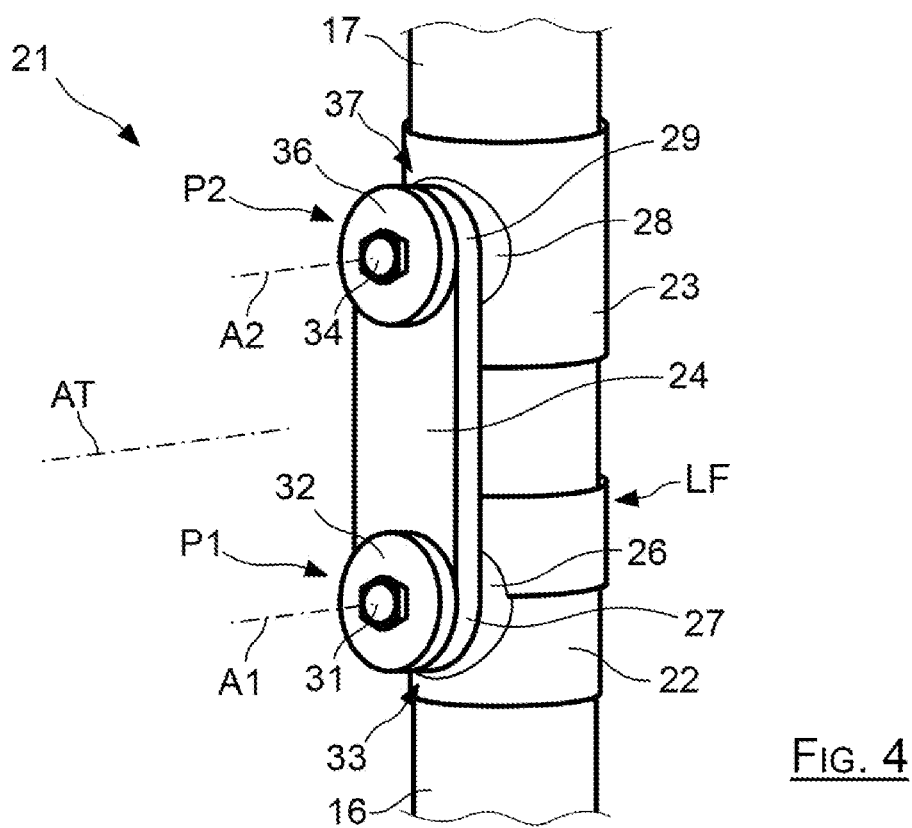
FIG. 4 is a perspective view of a fastener according to the invention.

This fastener 21, that becomes more apparent in FIG. 4, has a fixed sleeve 22 wherein are engaged the upper end of the intermediate tube 16 and the lower end of the lateral tube 17 of the backrest 9, a sliding ring 23 surrounding the lateral tube 17, and a link rod 24 connected to the fixed sleeve 22 and to the sliding ring 23.

The sleeve 22 and the ring 23 each have an essentially cylindrical shape, the internal diameter of which corresponds to the external diameter of the tube that they surround.

The sleeve 22 has an external boss 26 to which is fixed a first end 27 of the link rod 24, and similarly, the sliding ring 23 has an external boss 28 to which is fixed a second end 29 of the link rod 24.

More particularly, a screw 31 passes through a washer 32, or cap, as well as the first end 27 while being screwed into the boss 26, in such a way as to hold tight the end 27 between the washer 32 and this boss 26 to form a brake 33. The screw 31 extends along a radial axis A1 in relation to the axis of the sleeve 22, this axis A1 being oriented parallel to the transverse direction AT.

The first end 27 of the link rod 24 is thus connected to the sleeve 22 by a pivot link P1 of axis A1, which incorporates a brake 33 opposing the rotation of the link rod in relation to the sleeve, in order to slow down this rotation by exerting a reaction torque against it.

As understood, the braking incorporated into this pivot link P1 is caused by the friction forces that the washer 32 and the boss 26 exert on the end 27 that they hold tight, in accordance with an operation that is similar to that of a disk brake. The braking caused by the brake 33 is thus as high as the tightening of the screw 31 is significant.

In the same way, a screw 34 passes through a washer 36 as well as the second end 29 of the link rod 24 to be screwed into the external boss 28 of the sliding ring 23 in such a way as to hold tight the end 29 in order to form another brake 37. This other screw extends along an axis A2 parallel to the axis A1. The second end 29 of the link rod 24 is thus connected to the sliding ring 23 by a pivot link P2 of axis A2 and incorporating a brake 37.

The end of the tube 17 is for its part engaged in the sleeve 22 over a short length, namely at least less than the diameter of this tube 17, in order to make it possible to remove it from the lower end of the sleeve 22 in the event of application to the backrest of a rotation torque about the axis AT.

The lower end of the tube 17 is fixed to the sleeve 22 for example by forced mounting or by gluing with a specific adhesive to form a sacrificial mechanical link LF. This sacrificial link LF is a complete mechanical link (that is to say a link of "embedding" type) that gives way in the event of application to the backrest 9 of a torque about the axis AT greater than a threshold value.

Figure 5:
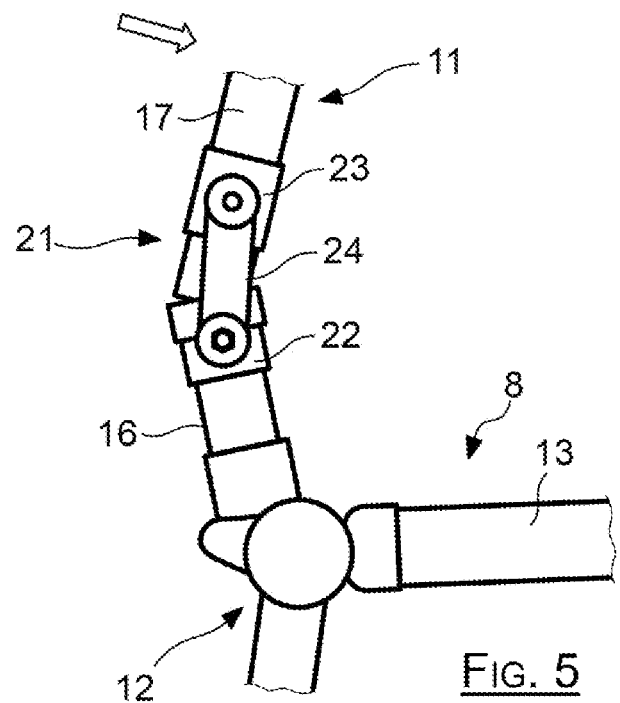
FIG. 5 is a side view of a portion of upper frame and of lower frame secured by a fastener according to the invention at the beginning of folding of the seatback.

In practice, when the torque applied to the backrest 9 about the axis AT is greater than a threshold value, the rigid link of the tube 17 with the sleeve 22 gives way to enable the rotation of the backrest about an axis corresponding approximately to the axis AT, as schematically represented in FIG. 5.

This sacrificial link LF is located opposite the link rod 24 in the transverse direction AT, that is to say at a level located between the links P1 and P2 in relation to the vertical direction, such that when this link LF is broken, the backrest and the seat part remain secured to one another by the link rod 24.

During a qualification test, the shock of the head of the passenger located behind the seat 5, on the top of the backrest 9 of this seat results in the application of a torque about the axis AT that is greater than the threshold value, causing the rupture of the sacrificial link LF. The rupture of this link LF thus ensures a first portion for absorbing the impact, and the tilting of the backrest 9 that follows ensures a second portion thereof while continuing to slow down the head to reduce the intensity of the shock.

Figure 6:
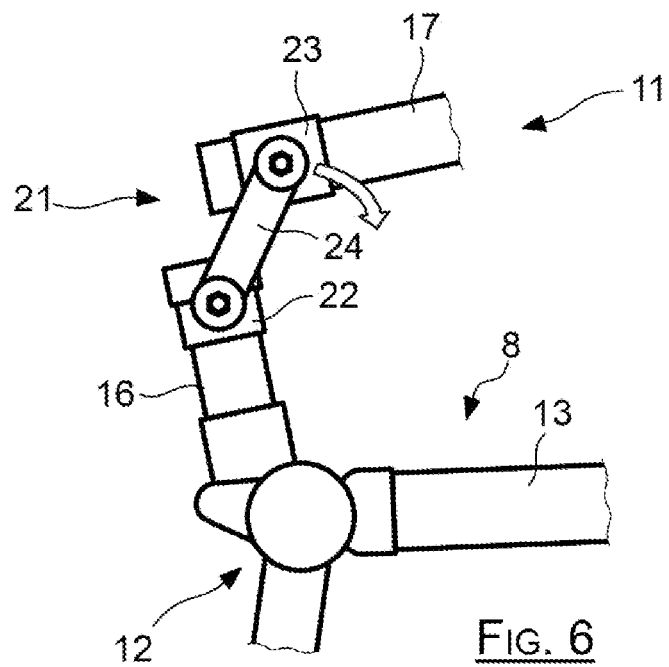
FIG. 6 is a side view of a portion of upper frame and of lower frame secured by a fastener according to the invention at the end of folding of the seatback.

As can be clearly seen in FIG. 6, the rotation of the backrest 9 about the axis AT induces a rotation of the link rod 24 in relation to the sleeve 22 and in relation to the ring 23, about the pivot links P1 and P2. Thanks to the brakes 33 and 37 that equip these links P1 and P2, the tilting of the backrest 9 is slowed down to continue absorbing the shock of the head on the top of this backrest 9 until immobilisation.

As understood, the tightening of the screws 31 and 34 makes it possible to adjust the level of braking generated by the brakes 33 and 37, that is to say adjust the level of shock absorption, which may be determined for example by the specifications of the qualification test, by orientating the seat in relation to the longitudinal direction, or by other parameters.

Figure 7:
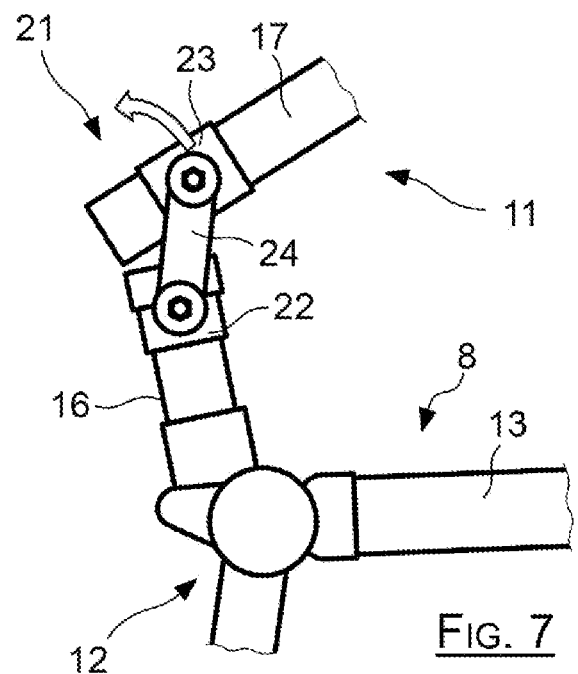
FIG. 7 is a side view of a portion of upper frame and of lower frame secured by a fastener according to the invention at the beginning of putting the seatback upright.

As can be seen in FIG. 6, at the end of the shock, the backrest 9 is folded almost horizontally, that is to say parallel to the seat part 6. This backrest 9 may then be raised by applying a force in the opposite direction of the shock to substantially put it vertically upright, as illustrated in FIGS. 7 and 8.

This uprighting movement corresponds for example to the forces exerted by the back of the passenger of the seat 5 on the backrest 9 when they sit back up after the shock, or to those of another passenger grasping the backrest 9 with their hands to put it upright in order to free the passage.

The uprighting forces are exerted on the backrest 9 against the brakes 33 and 37 incorporated into the links P1 and P2 to enable these links to reposition. During this movement, the lower end of the tube 17 bears on the upper edge of the sleeve 22, thanks to a sliding of the tube 17 made possible by the sliding ring 23, which enables the uprighting movement to end without having to re-engage the end of the tube 17 in the sleeve 22.

Figure 8:
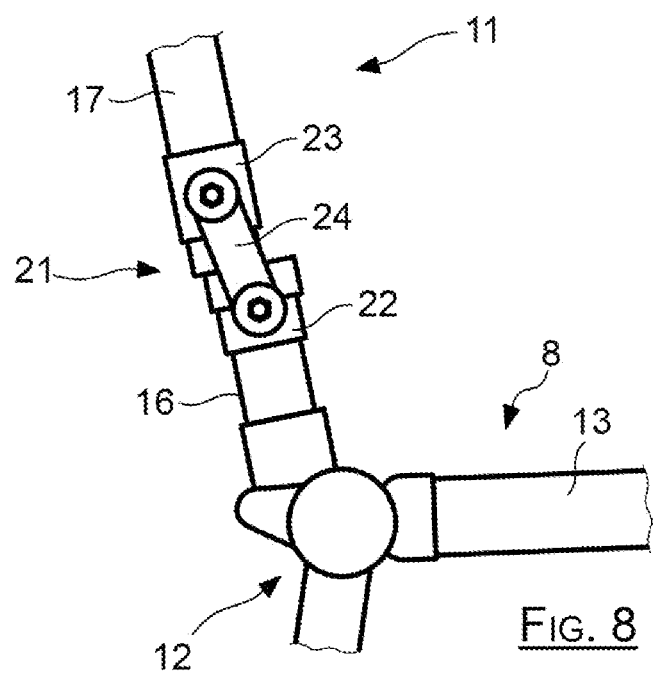
FIG. 8 is a side view of a portion of upper frame and of lower frame secured by a fastener according to the invention at the end of putting the seatback upright.

As illustrated in FIG. 8, once the uprighting has ended, the tube 17 extends parallel to the intermediate tube 16 while being slightly offset rearwardly in relation to it, due to the fact that the link rod 24 occupies a slightly oblique position in relation to these tubes. The oblique position of the link rod results from the fact that the torque applied to the link P1 is greater than that applied to the link P2 during the uprighting, such that the rotation of this link P1 may be greater than that of the link P2 during the entire movement.

Thanks to the sliding of the tube 17 in the ring 23, the lower end of this tube 17 bears against the rear portion of the upper edge of the sleeve 22, in such a way as to enable the backrest 9 to occupy a fully upright position without needing to re-engage the tube 17 in the sleeve 22.

In the upright situation in FIG. 8, the brakes 33 and 37 of the links P1 and P2 oppose a folding of the backrest 9 so that it is stabilised in its upright state so as to enable the occupants to evacuate their seats.

Figure 9:
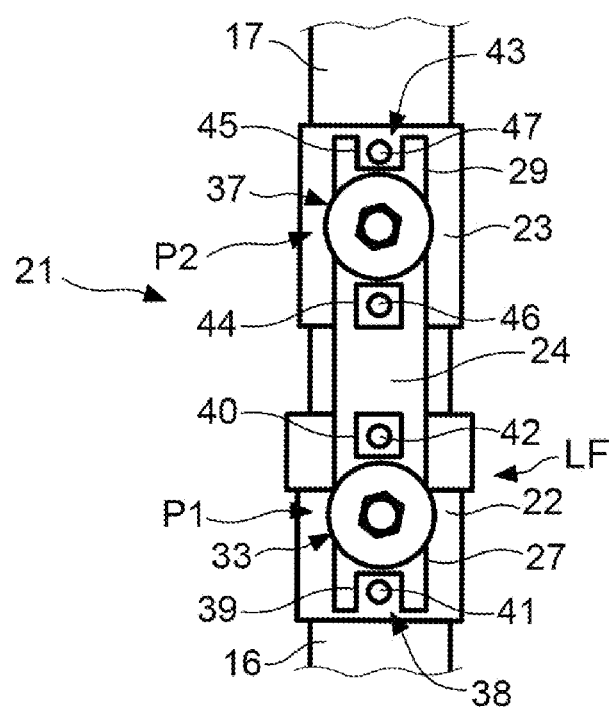
FIG. 9 is a side view of a variant of fastener according to the invention in normal situation.
Figure 10:
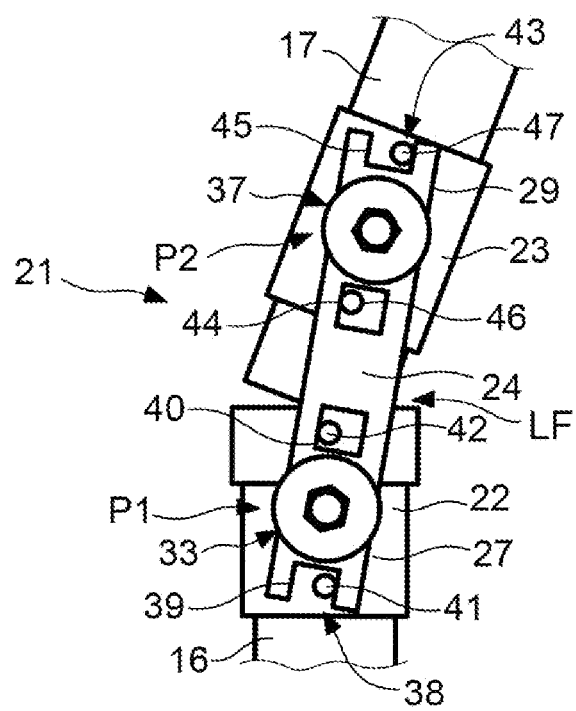
FIG. 10 is a side view of a variant of fastener according to the invention at the beginning of folding of the backrest.

Advantageously, and as illustrated in FIGS. 9 and 10, the fastener 21 is equipped with a system of stops limiting the folding of the backrest 9 during the shock to an angular travel that is sufficient to absorb it, but that remains fairly limited so that after tilting, this backrest does not form an obstacle for the evacuation of passengers.

In this case, the first pivot link P1 is equipped with a system of stops 38, which comprises two holes 39 and 40 formed in the first end 27 of the link rod 24 while being located on either side of the axis A1, and the sleeve 22 is provided with two retainers 41 and 42 also located on either side of the axis A1.

These two retainers 41 and 42 here have forms of cylindrical pins extending parallel to the axis A1 to be located respectively in the holes 39 and 40. The system of stops 38 formed by the holes and the retainers limits the possible rotation amplitude for the link P1 to a value that here is in the order of 10°, on one side and on the other of the neutral position represented in FIG. 9.

Similarly, the second pivot link P2 is equipped with another system of stops 43, which comprises two other holes 44 and 45 formed in the second end 29 of the link rod 24 on either side of the axis A2, and the ring 23 is provided with two retainers 46 and 47 on either side of the axis A2 extending parallel to this axis to be located respectively in the holes 44 and 45. This other system of stops 43 limits the mobility of the link P2 to approximately 10° on one side and on the other in relation to the neutral position represented in FIG. 9.

In these conditions, and as schematically illustrated in FIG. 10, the forward tilting movement of the backrest during a shock is limited to a value in the order of 20°, which corresponds to the 10o of the link P1 to which the 10o of the link P2 are added, in relation to the neutral position in FIG. 9. The clearance angle may be adjusted according to the specifications of the qualification test, according to the overall dimension of the backrest or other parameters.

As will be understood, the fastener represented in FIGS. 9 and 10 operates in the same way as that in FIG. 4 with the sole difference that the tilting amplitude of the backrest is limited. Thus in the case of the link in FIGS. 9 and 10, when a shock occurs firstly it causes the rupture of the link LF followed by the tilting of the backrest braked by the brakes 33 and 37 of the links P1 and P2 and angularly limited by the systems of stops 38 and 43.

When the backrest is tilted, which corresponds to the situation in FIG. 10, although it is tilted with a small inclination, it may nevertheless be put upright if necessary, by applying a reasonable force, against the brakes 33 and 37, in the same way as in the example in FIGS. 7 and 8.

In the example in FIGS. 4 to 8, the two pivot links P1 and P2 are provided with brakes, and in the example in FIGS. 9 and 10 they are in addition each equipped with a system of stops limiting the tilting of the backrest.

However, the two links do not necessarily have to be equipped with a brake and with a system of stops, given that it may be sufficient that one is equipped with a system of stops and the other with a brake. Furthermore, the brake may be of the type to exert a radial force on a fixed cylindrical portion instead of exerting an axial force on a flat portion of the movable link rod.

Figure 11:
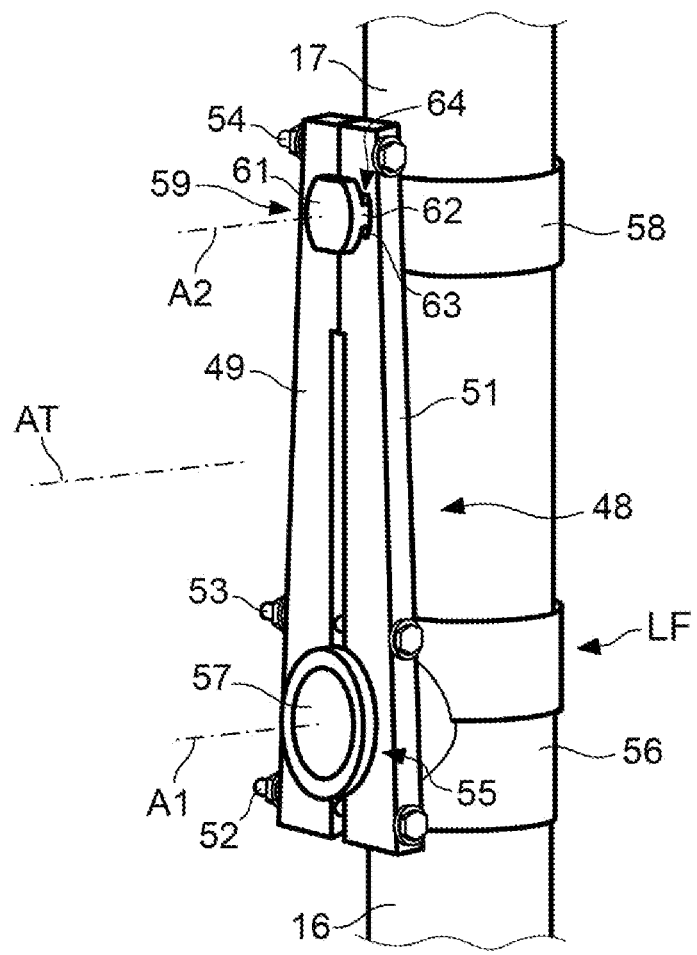
FIG. 11 is a perspective view of another variant of fastener according to the invention.

Thus, in the embodiment presented in FIG. 11, the first pivot link P1 is only equipped with a brake that exerts a radial force, and the second pivot link P2 only has a system of stops limiting its angular mobility.

In this other embodiment, the fastener 21 has a link rod 48 formed of two half-link rods 49 and 51 assembled with one another by three screws 52, 53 and 54.

The lower sleeve, referenced 56, is of the same type as the sleeve 22 for receiving the intermediate tube 16 and a lower portion of the lateral tube 17, but it has a cylindrical bearing 57 extending along the axis A1 of the link P1, instead of having a boss.

The sliding ring, referenced 58, there also surrounds the lateral tube 17, but it has a bearing surface 59 extending in the direction A2 of the link P2, instead of including a boss.

The two half-link rods 49 and 51 are symmetrical to one another in relation to a plane containing the axes A1 and A2, and they each have a semi-cylindrical cavity in their lower ends, and another essentially semi-cylindrical cavity in their upper ends.

When the two half-link rods 49 and 51 are joined, as in the case in FIG. 11, the link rod 48 that they form thus surrounds the bearing 57 at the lower opening delimited by the two semi-cylindrical cavities in order to form the pivot link P1. In this situation, the upper essentially semi-cylindrical cavities delimit an upper opening of the link rod 48 that surrounds the bearing surface 59 to form the link P2.

The two half-link rods are fixed to one another at their lower ends by the two screws 52 and 53 that are located on either side of the link P1, and extend in a direction that is perpendicular to the axis A1 and to the axis of the sleeve 56. They are also fixed to one another by an additional screw 54 located at their upper ends, this additional screw having the same orientation as the screws 52 and 53.

As can be seen in FIG. 11, the two half-link rods 49 and 51 are separated from one another by a spacing E that extends over the entire middle region up to their lower ends so as to form two branches having a certain flexibility. Thus, the tightening of the screws 52 and 53 makes it possible to adjust the holding tight force exerted by the two half-link rods on the bearing 57 to adjust the intensity of the friction torque opposed by the link P1 when the link rod 48 rotates in relation to the sleeve 56 about the axis A1.

The link P1 thus has a brake 55 formed by the tightening of the screws 52 and 53 compressing towards one another the half-link rods 49 and 51 holding tight the bearing 57, which corresponds to an arrangement similar to that of a drum brake, wherein the braking is as high as the tightening of the screws 52, 53 is significant.

The bearing surface 59 that protrudes from the outer face of the ring 58 in the direction A2 has a cylindrical body ended by a plate 61 of dimensions greater than the diameter of this body, in order to retain the second end of the link rod 48, and a retainer 62 radially protruding from the external face of the cylindrical body.

The upper opening of the link rod 48, delimited by the upper cavities and that surrounds this bearing surface 59, has a cylindrical shape having a radial notch 63 receiving the retainer 62. This notch has an angular extension about the axis A2 that is greater than the angular extension of the retainer 62 about this axis A2.

The retainer 62 and the notch 63 form a system of stops 64 that limits the extent of possible rotation for the link rod 48 about the axis A2 to a value corresponding to the difference of angular extension of the notch 63 and of the retainer 62. This extension here is in the order of 10° on one side and on the other in relation to the neutral position in FIG. 11.

Generally, and for the various embodiments that have been described, the link rod as well as the washer and the screws, the boss, the bearing or the bearing surface, may be metal components, such that intermediate elements of the plastic washer and/or ring type may be provided to be interposed between these components so as to better control the friction in the pivot link, and thereby its braking.

The material used for these intermediate elements has a relatively high stable friction coefficient in the event of friction with a metal material. This material is advantageously a plastic material, that may be a composite material incorporating a plastic resin, nylon, POM (polyoxymethylene), or also ABS (acrylonitrile-butadiene-styrene). This material may also be rubber or also a ceramic material.

As will be understood, the invention makes it possible to form a backrest system able to absorb the impact of the rear passenger in the event of shock, and wherein the level of absorption may easily be adjusted, only by modulating the level of tightening of one or more screws of the fastener.

Thus, when it concerns a particular seat having a diagonal installation, inducing an intensity of shock lower than the other seats, the tightening of the screws of the fastener may be reduced in order to be adapted to this particular installation, without it being necessary to provide a fastener having a different size.

Moreover, in the examples in the figures, a fastener connecting an upper frame to a lower frame is described, given that a seat advantageously has two fasteners of this type, namely one on each side. These fasteners are located at the junction of the backrest with the seat part, fully or partially in the lower portion of the backrest as in the example of the figures, and/or in the rear portion of the seat part.

What is claimed is:

1. Seat intended to be fixed to the floor of a vehicle, having a seat part incorporating a lower frame, and a backrest incorporating an upper frame secured to the lower frame by at least one fastener that enables the backrest to tilt about a transverse axis of the seat, this fastener comprising:
   a link rod having a first end connected to the lower frame by a first pivot link of axis parallel to the transverse axis, and having a second end connected to the upper frame by way of a second pivot link of axis parallel to the transverse axis;
   each pivot link having a rotation brake and/or a system of stops limiting its rotation amplitude;
   a pivot link including a brake having a screw passing through one end of the link rod while being screwed into a boss, in order to hold tight the link rod end to generate a friction torque during reaction to a rotation of the end of the link rod in relation to the boss to brake this rotation;
   a sacrificial mechanical link that connects the lower frame to the upper frame while being located opposite the link rod.

2. The seat according to claim 1, having a sliding ring surrounding a tube of the upper frame, and wherein the second pivot link connects the second end of the link rod to this sliding ring.

3. The seat according to claim 1, wherein the degree of tightening of the screw makes it possible to adjust the degree of braking of the brake of the pivot link.

4. The seat according to claim 1, wherein a pivot link including a brake has a link rod made of two half-link rods secured to one another by at least one screw holding tight these two half-link rods on a bearing to generate a friction torque during reaction to a rotation of the link rod in relation to the bearing.

5. The seat according to claim 1, comprising at least one plastic element interposed between the link rod end and/or the boss and/or the screw and/or the bearing.

6. Seat according to claim 4, comprising at least one plastic element interposed between the link rod end and/or the boss and/or the screw and/or the bearing.

7. The seat according to claim 1, comprising a pivot link including a system of stops that has at least one hole formed in the end of the link rod and a retainer extending into the hole, the hole having about the axis of the link an angular extension greater than that of the retainer.

8. The seat according to claim 1, comprising a pivot link including a system of stops that has a bearing surface having a cylindrical body supporting a retainer radially protruding from this cylindrical body, this bearing surface being surrounded by a link rod end having an opening surrounding the body, this opening being provided with a notch receiving the retainer, this notch having about the axis of the link an angular extension greater than that of the retainer.

9. The seat according to claim 1, comprising a fixed sleeve rigidly secured to the lower frame wherein is engaged one end of a tube of the upper frame to form the sacrificial mechanical link.

10. The seat according to claim 9, wherein the end of the tube of the upper frame is fixed to the sleeve wherein it is engaged by gluing.

\* \* \* \* \*